(12) United States Patent
Whitfield

(10) Patent No.: US 6,358,171 B1
(45) Date of Patent: Mar. 19, 2002

(54) POWER TRANSMISSION BELT

(75) Inventor: Kevin John Francis Whitfield, Dumfriesshire (GB)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 09/443,773

(22) Filed: Nov. 19, 1999

Related U.S. Application Data

(60) Provisional application No. 60/109,117, filed on Nov. 19, 1998.

(51) Int. Cl.$^7$ .............................. F16G 1/00; F16G 5/00; F16G 9/00
(52) U.S. Cl. ........................................ 474/266; 474/263
(58) Field of Search ........................ 474/237, 260–265, 474/171–175, 191, 192, 202, 205, 204, 266, 271, 268; 523/153, 155, 156; 169/47, 44, 48; 524/432, 433, 448; 29/517, 445, 441; 156/139, 142

(56) References Cited

U.S. PATENT DOCUMENTS

| | | | |
|---|---|---|---|
| 2,507,852 A | | 5/1950 | Case |
| 3,078,206 A | | 2/1963 | Skura |
| 3,250,653 A | | 5/1966 | Geist et al. |
| 3,535,946 A | | 10/1970 | Miller |
| 4,031,768 A | | 6/1977 | Henderson et al. |
| 4,235,119 A | | 11/1980 | Wetzel |
| 4,657,526 A | | 4/1987 | Tangorra et al. |
| 4,665,993 A | * | 5/1987 | Balassa ............. 169/44 |
| 5,674,143 A | * | 5/1987 | Kumazaki et al. ........ 474/263 |

(List continued on next page.)

FOREIGN PATENT DOCUMENTS

DE    28 45 117 A    4/1980

Primary Examiner—Thomas R. Hannon
Assistant Examiner—Marcus Charles
(74) Attorney, Agent, or Firm—M. S. Olson, Esq.; C. H. Castleman, Esq.; S. G. Austin, Esq.

(57) ABSTRACT

A power transmission belt with a good balance of high temperature resistance, good belt durability and low temperature flexibility, and a service range of about −40° C. to about 140° C. The main belt body portion of the power transmission belt is manufactured from an elastomeric material comprising 100 parts by weight of an at least partially hydrogenated nitrile group-containing copolymer rubber, and from about 0.5 to about 50 parts per hundred weight of said rubber of a fiber reinforcement having a length to diameter ratio of greater than 10:1. The nitrile group-containing copolymer rubber preferably comprises (1) from about 5 to about 40 percent of unsaturated nitrile monomer units, (2) from about 1 to about 80 percent of units of at least one second monomer selected from the group consisting of fluorine-free unsaturated carboxylic acid ester monomer units and fluorine-containing vinyl monomer units, or any monomer possessing the characteristic of lowering the glass transition temperature of the rubber; (3) up to about 20 percent of conjugated diene monomer units and (4) the balance being hydrogenated conjugated diene monomer units, preferably wherein the sum of the contents of the monomer units (1) and (2) is preferably from about 30 to 90 percent by weight and the sum of the contents of the monomer units (3) and (4) is from about 10 to about 70 percent by weight. The use of the fiber reinforcement in the nitrile group-containing, highly saturated copolymer rubber provides substantially improved low temperature crack resistance while improving the high temperature resistance of the belt.

17 Claims, 3 Drawing Sheets

U.S. PATENT DOCUMENTS

| | | | |
|---|---|---|---|
| 4,785,029 A | * 11/1988 | Honma et al. | 523/153 |
| 4,895,555 A | 1/1990 | Watanabe et al. | |
| 4,956,417 A | 9/1990 | Hayashi et al. | |
| 5,013,796 A | 5/1991 | Hayashi et al. | |
| 5,013,797 A | 5/1991 | Hayashi et al. | |
| 5,217,801 A | 6/1993 | Hamada | |
| 5,250,010 A | 10/1993 | Mishima et al. | |
| 5,254,050 A | 10/1993 | Nakajima et al. | |
| 5,387,160 A | 2/1995 | Nakajima et al. | |
| 5,498,212 A | 3/1996 | Kumazaki | |
| 5,501,908 A | 3/1996 | Shioyama et al. | |
| 5,683,819 A | 11/1997 | Mori et al. | |
| 5,741,198 A | * 4/1998 | Fujiwara et al. | 474/237 X |
| 5,852,093 A | * 12/1998 | Aimura et al. | 524/432 |

\* cited by examiner

POWER TRANSMISSION BELT

This application claims the benefit of U.S. Provisional Application No. 60/109,117, filed Nov. 19, 1998.

BACKGROUND OF THE INVENTION

The present invention relates generally to endless power transmission belts having excellent high temperature durability as well as significantly improved low temperature crack resistance. More particularly, the invention relates to endless power transmission belts and process therefor, manufactured from a fiber reinforced nitrile group-containing, highly saturated copolymer rubber, which exhibit a good balance of high temperature resistance, good belt durability and low temperature crack resistance. The invention furthermore relates to synchronous belts and frictional power transmission belts, manufactured from a fiber reinforced nitrile group-containing, highly saturated copolymer rubber, which exhibit good belt durability and a service range of from about −40° C. to about 140° C.

Power transmission belts used with toothed pulleys (or sprockets or sheaves) are well known in the art. The most widely used of these toothed belts are so-called synchronous or positive drive belts. It is well known to use a toothed belt to provide synchronization between two rotating shafts, the belt comprising a back surface section, a plurality of teeth spaced apart and disposed opposite of said back surface section, whereby a tooth land is formed between two adjacent teeth, a tensile layer contacting and interposed between said back surface section and said plurality of teeth and preferably a covering for each of said teeth and each of said tooth lands, wherein the back surface and the plurality of teeth are made of an elastomeric material. Certain applications, exemplified by automotive applications, place high demands on power transmission belts, including a high degree of durability and a broad service temperature range.

In operation, the power transmission toothed belt is subjected to the most stress at the bottom of each tooth when meshed with complementary pulley teeth to transmit power. Since this stress is substantially sustained by the elastomeric material, the material beneficially possesses a high modulus so that the toothed belt can withstand a high load. It is known to increase the amount of filler, e.g., carbon black, in the belt elastomer to increase the cured rubber's modulus. Increasing filler content however, is known to adversely impact belt performance at both high- and low temperatures. Both poor high temperature aging resistance and poor low temperature capability in a synchronous belt manifest themselves in the formation of cracks in the back surface section.

It has also been suggested to incorporate a fiber reinforcement means into the matrix of the belt's elastomeric components to increase the shear strength of the teeth. There has been some criticism as to the practical application of this technique with respect to its impact upon the tensile strength of the belt. Synchronous belts have typically been made by one of three methods: the extruded tooth method, as described by Case in U.S. Pat. No. 2,507,852, the tooth pre-form method as described by Geist et al. in U.S. Pat. No. 3,250,653 or the flow-through method as described by Skura in U.S. Pat. No. 3,078,206. With respect to fiber loading of the belt elastomer, it has been noted that in practice, fiber reinforced toothed belts prepared by the flow-through method of Skura exhibit decreased tensile strength because the tensile members must be spaced further apart than in non-fiber-loaded elastomer belts, to allow the fiber-filled elastomeric material to flow through the tensile members.

As noted above, power transmission belts exemplified by automotive synchronous belts are generally required to operate at increasingly low and high temperatures. Synchronous belts may be used, for example, for driving the overhead camshaft of an automobile. It is not unusual for the operating temperature of the belt to reach 140° C. in such applications. The elastomeric material used for the back surface and plurality of teeth becomes vulnerable to heat aging in such harsh environments, which can give rise to severe cracking and premature failure.

It has been suggested to load the elastomeric material of the belt with certain types of fiber to improve the high temperature resistance thereof. Adding fiber to the uncured elastomer however, has the effect of increasing both the viscosity of the uncured material, and the modulus, i.e., hardness or stiffness, of the material in the cured state. In cold weather climates, ambient temperatures can reach −40° C. or lower. The higher the modulus and hardness of an elastomeric material however, the poorer its low temperature flexibility and crack resistance.

U.S. Pat. Nos. 5,250,010 to Mishima et al. and 5,254,050 to Nakajima et al. show the experimental tests run on V-ribbed belts to measure heat resistance and low temperature resistance range from −30° C. to 130° C. and −30° C. to 120° C., respectively, but do not disclose a power transmission belt having good durability over a service range of from about −40° C. to about 140° C. High temperature resistance and good load carrying capability can be obtained in a synchronous belt having elastomeric portions made of a conventional hydrogenated nitrile-butadiene rubber (HNBR) copolymer (incorporating two monomers only). However, synchronous belts made of such HNBR copolymers have not been known to exhibit good low temperature flexibility or crack resistance below −30° C. or −35° C.

The need remains, particularly in the area of synchronous and frictional power transmission belts formed of rubber elastomer, for a power transmission belt that exhibits a good balance of high temperature resistance, good belt durability and low temperature crack resistance.

SUMMARY OF THE INVENTION

The present invention provides a power transmission belt adapted to engage a sheave or pulley, comprising a main belt body portion; a pulley- or sheave-contact portion integral with the body portion, and a tensile member disposed in the body portion. At least one of the main belt body portion and the pulley contact portion comprises an elastomeric material comprising 100 parts by weight of an at least partially hydrogenated nitrile group-containing copolymer rubber, and from about 0.5 to about 50 parts per hundred weight of said nitrile group-containing copolymer rubber of a fiber reinforcement material. According to a preferred embodiment, the at least partially hydrogenated nitrile group-containing copolymer rubber comprises (1) from about 5 to about 40 percent of unsaturated nitrile monomer units, (2) from about 1 to about 80 percent of units from at least one second monomer which possesses the characteristic of lowering the glass transition temperature of the rubber, (3) up to about 20 percent of conjugated diene monomer units and (4) the balance being hydrogenated conjugated diene monomer units. In a preferred embodiment, the sum of the contents of the monomer units (1) and (2) is from about 30 to 90 percent by weight and the sum of the contents of the monomer units (3) and (4) is from about 10 to about 70 percent by weight. A process for forming such belt is furthermore provided.

The use of the fiber reinforcement in the at-least-partially hydrogenated nitrile group-containing copolymer rubber according to a preferred embodiment of the invention has unexpectedly been found to provide substantially improved low temperature crack resistance while improving the high temperature resistance of the belt compared to conventional belts. The invention furthermore provides a power transmission belt with a service range of about −40° C. to about 140° C. or even higher, as well as good belt durability.

BRIEF DESCRIPTION OF THE DRAWINGS

The accompanying drawings, which are incorporated in and form a part of the specification and in which like numerals designate like parts, illustrate preferred embodiments of the present invention and together with the description, serve to explain the principles of the invention. In the drawings.

DESCRIPTION OF THE PREFERRED EMBODIMENTS

Figure 1:
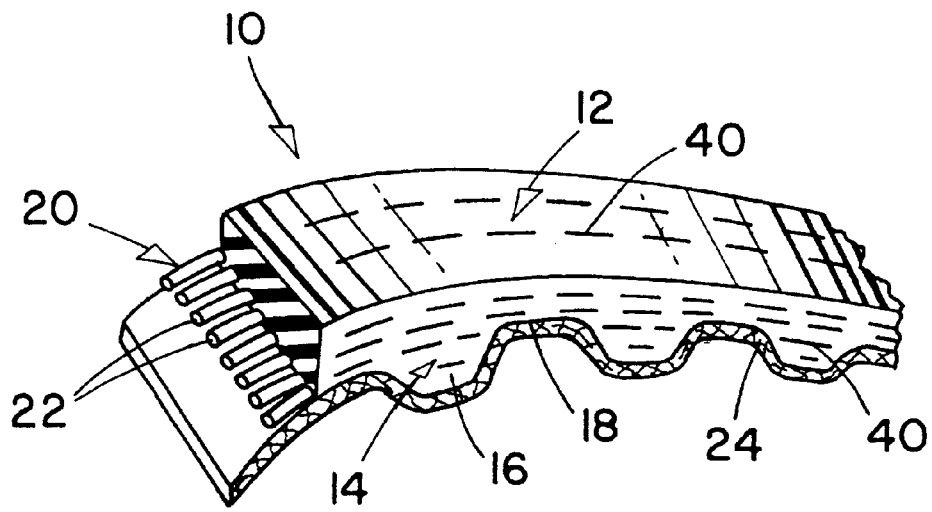
FIG. 1 is a perspective view, with parts in section, of a synchronous belt constructed in accordance with an embodiment of the present invention.

Referring to FIG. 1, a synchronous belt 10 in accordance with an embodiment of the present invention is illustrated. The belt 10 includes a main belt body portion, or back surface section 12, and a second portion adapted to engage a toothed pulley or sheave, the portion here comprising a plurality of teeth 16 and tooth lands 18 which are formed between two adjacent teeth. At least one of the back surface section 12 and plurality of teeth 16 is made of an elastomeric material reinforced with fiber 40 (shown schematically). The tooth shape is not limited to that shown in FIG. 1, thus any suitable tooth shape may be utilized for the synchronous belt including that shown in FIG. 3.

A tensile layer 20, contacting and interposed between the back surface section 12 and the plurality of teeth 16, provides support and strength to the belt 10. In FIG. 1, the tensile layer is in the form of at least one continuous helically disposed strain-resisting cord 22 embedded within the elastomeric material and aligned longitudinally along the length of the belt 10. It should be understood, however, that any type of suitable or conventional tensile layer 20 may be utilized. Moreover, any desired material may be used as the strain-resisting cord or cords 22, such as cotton, rayon, nylon, polyester, aramid, glass, carbon and steel. In the preferred embodiment of FIG. 1, the tensile layer 20 is in the form of a plurality of glass fiber strain-resisting cord ends formed from a pair of continuous helically wound cords.

According to a preferred embodiment of the invention, reinforcement fibers 40 are preferably distributed substantially throughout the body of the belt composed of the back surface section 12 and the teeth 16. It is believed that in accordance with the present invention, the fibers 40 in the back surface section 12 help stop cracks from propagating in the back surface section; cold- or heat age cracks that may initiate in the back surface section grow until the crack encounters the fiber reinforcement 40. The fiber is thus believed to inhibit the growth of the crack and thereby improve performance of the belt at both high and low temperatures. The fibers 40 in the teeth 16 moreover increase the shear strength of the teeth and thus provide a higher load-carrying capability than a similar belt made without fiber reinforcement.

A covering 24 may be utilized which intimately fits along the plurality of teeth 16 and tooth lands 18 of the belt 10 to form a reinforcing fabric covering therefor. This covering may be of any desired configuration such as a conventional weave consisting of warp and weft threads at any desired angle or may consist of warp threads held together by spaced pick cords, or of a knitted or braided configuration, stretch fabric, non-woven fabric and the like. More than one ply of fabric may be employed. Conventional fabrics may be employed using such materials as cotton, polyester, polyamide, aramid, nylon, various other natural and synthetic fibers and mixtures thereof. In a preferred embodiment of the invention, the covering 24 consists of a stretch fabric of nylon 6, 6.

The synchronous belt 10 may be produced by any suitable method of manufacturing positive drive toothed belts. These include the extruded tooth method, as described by Case in U.S. Pat. No. 2,507,852, the tooth preform method as described by Geist et al. in U.S. Pat. No. 3,250,653 or the flow-through method as described by Skura in U.S. Pat. No. 3,078,206. These three U.S. Pat. Nos. 2,507,852; 3,250,653 and 3,078,206 are incorporated herein by reference for the purpose of describing suitable manufacturing methods for positive drive, toothed power transmission belts of the present invention.

The addition of fiber in an elastomeric material generally results in the material having an increased viscosity. U.S. Pat. No. 4,235,119 to Wetzel reports that in order to produce a good tooth profile in a synchronous belt reinforced with fiber, and manufactured by the flow-through method of Skura, the continuous helically wound strain-resisting cord or cords must be spaced within the tensile layer farther apart than the spacing in a non-fiber reinforced belt. For example, a synchronous belt with a tooth pitch of between 8 mm and 10 mm and at least one continuous helically disposed strain-resisting glass fiber cord, with a diameter of about 1.15 mm, would utilize a standard cord spacing of 18 to 20 strands per inch (7 to 8 strands/cm) belt width. Yet when producing a belt from a high viscosity compound, such as an elastomeric material reinforced with fiber, it may be necessary to space the strain-resisting helically wound cords farther apart, reducing the number of wound cords by about 2 strands per inch (0.8 strands/cm). Spacing the strain-resisting wound cords farther apart however generally results in a reduction in the belt's tensile strength. Conversely, in the practice of the present invention, it has been surprisingly found that the strain-resisting helically wound cords do not have to be spaced farther apart when utilizing the flow-through method of Skura. Although it is unexpected to utilize standard cord spacing with a fiber reinforced elastomeric material, the preferred embodiment of this invention utilizes standard cord spacing. This standard cord spacing results in no reduction of tensile strength of the synchronous belt. In a preferred embodiment, a synchronous belt with a tooth pitch of between 8 mm and 10 mm, and more preferably of about 9.5 mm and a pair of continuous helically disposed strain-resisting glass fiber cords with a diameter of about 1.15 mm utilizes a standard cord spacing of 18 to 20 strands per inch (7 to 8 strands/cm) belt width.

Figure 2:
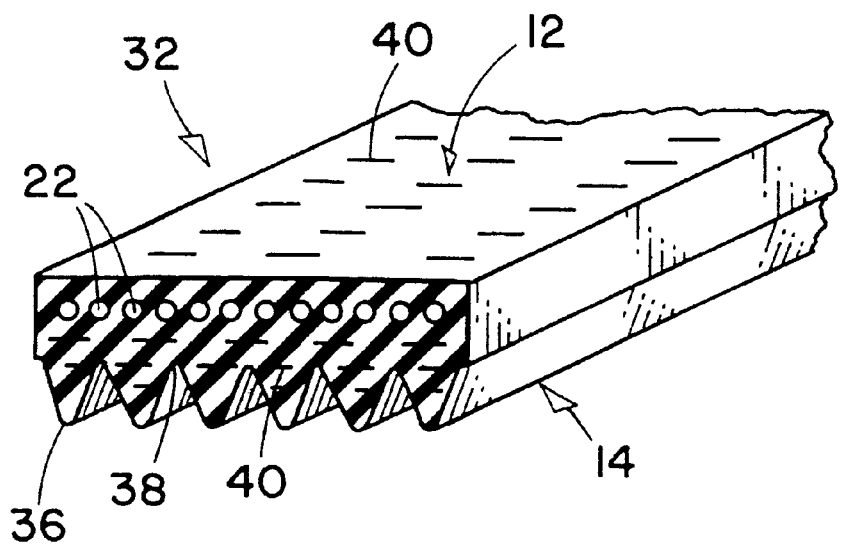
FIG. 2 is a perspective view, with parts in section, of a V-ribbed belt constructed in accordance with another embodiment of the present invention.

Referring to FIG. 2, a V-ribbed belt 32 in accordance with an embodiment of the present invention is illustrated. The V-ribbed belt 32 has a compression layer 14 forming the belt's pulley- or sheave-contact surface, and a tension layer 12, forming the belt's main body portion. At least one of the tension layer 12 and the compression layer 14 is formed of a fiber reinforced elastomeric material as described for the synchronous belt 10 of FIG. 1, for the back surface section 12 and the plurality of teeth 16 thereof. A plurality of V-shaped ribs 36 with grooves 38 defined between adjacent ribs 36 are formed in the compression layer 14 for accommodating a matched pulley (not shown). At least one tensile cord 22 is embedded within the elastomeric material and extends lengthwise of the V-ribbed belt in a continuous helical fashion between the tension layer 12 and the compression layer 14. The tensile cord or cords 22 is formed of a similar material to that used for the strain-resisting cord or cords of FIG. 1, mentioned above.

In addition to those forms illustrated in FIGS. 1 and 2, the term, "power transmission belt" as used in the present disclosure contemplates any conventional or suitable power transmission belt configuration, including flat belting; dual-sided V-ribbed belts (wherein V-ribs as described above for FIG. 2 extend along both the first and second surfaces of the belt); dual sided synchronous- or toothed belts (wherein alternating tooth and land portions as described above for FIG. 1 define both the first and second surfaces of the belt); and hybrids of the foregoing, e.g., toothed V-ribbed belts (wherein V-ribs as described above for FIG. 2 extend along a first surface of the belt, and alternating tooth and land portions as described above for FIG. 1 extend along the second surface of the belt).

In a preferred embodiment the belting, as described for example in FIGS. 1 and 2, incorporate as at least one of its main belt body portion and pulley- or sheave-contact portion the elastomeric material described below. For purposes of the present disclosure, the terms "pulley contact portion" and "sheave contact portion" will be used interchangeably to denote that belt surface opposite the main belt body portion, or back surface section. That elastomeric material comprises 100 parts by weight of an at least partially hydrogenated nitrile group-containing copolymer rubber and from about 0.5 to about 50 parts per hundred weight of said nitrile group-containing copolymer rubber of a fiber reinforcement 40. In the context of the present disclosure, the term, "copolymer" is used to denote an elastomer produced by the polymerization of two or more dissimilar monomers.

At least partially hydrogenated nitrile group-containing copolymer rubbers according to a preferred embodiment of the present invention are disclosed for example in the following three U.S. patents: U.S. Pat. No. 4,956,417, U.S. Pat. No. 5,013,796 and U.S. Pat. No. 5,013,797. The contents of these three patents are incorporated herein by reference for the purpose of describing preferred at least partially hydrogenated nitrile group-containing copolymer rubbers.

In a preferred embodiment, the at least partially hydrogenated nitrile group-containing copolymer rubber is highly saturated, and comprises (1) from about 5 to about 40 percent of unsaturated nitrile monomer units, (2) from about 1 to about 80 percent of units from at least one second monomer which possesses the characteristic of lowering the glass transition temperature of the rubber, (3) up to about 20 percent of conjugated diene monomer units and (4) the balance being hydrogenated conjugated diene monomer units. In a preferred embodiment the sum of the contents of the monomer units (1) and (2) is from about 30 to 90 percent by weight and the sum of the contents of the monomer units (3) and (4) is from about 10 to about 70 percent by weight.

In yet another preferred embodiment, the units from the at least one second monomer (2), above, are selected from the group consisting of fluorine-free unsaturated carboxylic acid ester monomer units and fluorine-containing vinyl monomer units.

In a further preferred embodiment, which utilizes a fluorine-free unsaturated carboxylic acid ester monomer as the second monomer, the nitrile group-containing, highly saturated copolymer rubber comprises (1) from about 10 to about 35 percent of unsaturated nitrile monomer units, (2) from about 15 to about 60 percent of fluorine-free unsaturated carboxylic acid ester monomer units, (3) up to about 15 percent of conjugated diene monomer units and (4) the balance being hydrogenated conjugated diene monomer units, wherein the sum of the contents of the monomer units (1) and (2) is from about 40 to 90 percent by weight, most preferably from about from about 55 to 90 percent by weight, and the sum of the contents of the monomer units (3) and (4) is from about 10 to about 60 percent by weight, most preferably from about 10 to about 45 percent by weight.

In another preferred embodiment, which utilizes a fluorine-containing vinyl monomer as the second monomer, the nitrile group-containing, highly saturated copolymer rubber comprises (1) from about 10 to about 35 percent of unsaturated nitrile monomer units, (2) from about 5 to about 60 percent of fluorine-containing vinyl monomer units, (3) up to about 15 percent of conjugated diene monomer units and (4) the balance being hydrogenated conjugated diene monomer units, wherein the sum of the contents of the monomer units (1) and (2) is from about 40 to 90 percent by weight, and the sum of the contents of the monomer units (3) and (4) is from about 10 to about 60 percent by weight.

Unsaturated nitrile monomers useful in this invention include but are not limited to acrylonitrile, methacrylonitrile and α-chloroacrylonitrile.

Second monomers, selected from the group consisting of a fluorine-free unsaturated carboxylic acid ester monomer and a fluorine-containing vinyl monomer, are set forth in aforementioned U.S. Pat. Nos. 4,956,417, 5,013,796 and 5,013,797, the contents of which, with respect to a preferred copolymer rubber for use in the present invention, has been expressly incorporated by reference.

Conjugated diene monomers useful in this invention include but are not limited to 1,3-butadiene, 2,3-dimethylbutadiene, isoprene and 1,3-pentadiene.

Examples of nitrile group-containing, highly saturated copolymer rubbers preferred in the practice of the present invention are available from Bayer, under the trademark THERBAN, grade number XN535C and also from Nippon Zeon, under the trademark ZETPOL, grade numbers 4110, 4120, 3110, and 3120.

To form the elastomeric material of the present invention the nitrile group-containing, highly saturated copolymer rubber may optionally be blended with preferably less than 50% by weight, more preferably up to about 25% by weight, and most preferably up to about 10% by weight based on the total elastomeric content of the blend of a second elastomeric material including but not limited to ethylene-alpha-olefin copolymers and terpolymers, nitrile butadiene copolymers, epichlorohydrin rubber, ethylene-vinyl-acetate copolymers, transpolyoctenamer, polyacrylic rubber, polybutadiene, isobutene-isoprene copolymers, halogenated isobutene-isoprene copolymers, ethylene-acrylic elastomers, polyisoprene rubber (natural or synthetic), silicone rubber, polychloroprene, polyurethane elastomers and mixtures thereof, to provide a power transmission belt which has a good balance of high temperature resistance, good belt durability and low temperature crack resistance, with a service range of about −40° C. to about 140° C. or higher.

The type of fibers 40 that may beneficially be used as a reinforcement of the belt elastomer include meta-aramids, para-aramids, polyester, polyamide, cotton, rayon and glass, as well as combinations of two or more of the foregoing, but is preferably para-aramid. The fibers may be fibrillated or pulped, as is well known in the art, where possible for a given fiber type, to increase their surface area, or they may be chopped or in the form of a staple fiber, as is similarly well known in the art. For purposes of the present disclosure, the terms "fibrillated" and "pulped" shall be used interchangeably to indicate this known characteristic, and the terms, "chopped" or "staple" will be used interchangeably to indicate the distinct, known characteristic. The fibers 40 preferably have a length from about 0.1 to about 10 mm. The fibers may optionally be treated as desired based in part on the fiber type to improve their adhesion to the elastomer. An example of a fiber treatment is any suitable Resorcinol Formaldehyde Latex (RFL).

In a preferred embodiment wherein the fibers are of the staple or chopped variety, the fibers 40 may be formed of a polyamide, rayon or glass, and have an aspect ratio or "L/D" (ratio of fiber length to diameter) preferably equal to 10 or greater. In addition, the fibers preferably have a length from about 0.1 to about 5 mm.

In another preferred embodiment wherein the fibers are of the pulped or fibrillated variety, the fibers are preferably formed of para-aramid, and possess a specific surface area of from about 1 $m^2/g$ to about 15 $m^2/g$, more preferably of about 3 $m^2/g$ to about 12 $m^2/g$, most preferably from about 6$m^2/g$ to about 8 $m^2/g$; and/or an average fiber length of from about 0.1 mm to about 5.0 mm, more preferably of from about 0.3 mm to about 3.5 mm, and most preferably of from about 0.5 mm to about 2.0 mm.

The amount of para-aramid fibrillated fiber 40 used in a preferred embodiment of the invention may beneficially be from about 0.5 to about 20 parts per hundred weight of nitrile rubber; is preferably from about 0.9 to about 10.0 parts per hundred weight of nitrile rubber, more preferably from about 1.0 to about 5.0 parts per hundred weight of nitrile rubber, and is most preferably from about 2.0 to about 4.0 parts per hundred weight of nitrile rubber. One skilled in the relevant art would recognize that at higher fiber loading concentrations, the elastomer would preferably be modified to include additional materials, e.g. plasticizers, to prevent excessive hardness of the cured elastomer.

The fibers may be added to the elastomer composition via any suitable and/or conventional technique, such as by first incorporating fibrillated fibers in a suitable first elastomer composition to form a fiber-loaded master batch having a final fiber content of about 50% by weight, or any other suitable amount; thereafter adding the fiber loaded master batch to the belt elastomer composition in order to allow for suitable distribution of the fiber in the belt elastomer composition; and then forming the belt with the thus fiber loaded elastomer composition via any suitable and/or conventional technique.

One such method that facilitates the preferred orientation of the fibers in the longitudinal (or run) direction of the toothed belt, as enunciated in Skura, U.S. Pat. No. 3,078, 206, includes the steps of arranging the tensile member within a notched mold; arranging the fiber-loaded tooth-forming rubber around and adjacent the tensile member within the mold; applying sufficient heat and pressure to force the elastomer composition through the tensile member and into the mold's notches to form belt teeth; and thereafter removing the belt from the mold. Where a fabric tooth jacket is utilized, such jacket would first be interposed between the tensile member and the surface of the mold containing the notches, and thereafter following the steps as outlined above.

The fibers 40 may be randomly dispersed throughout the elastomeric material in the power transmission belt. It is also possible, and is preferable for toothed belts fabricated in accordance with the present invention, that the fibers 40 are oriented throughout the elastomeric material in the power transmission belt, as illustrated for example in FIG. 3. As shown in the preferred embodiment of FIG. 3, the fibers 40 in the back surface section 12 are oriented longitudinally, i.e., in the run direction of the belt, generally parallel to the strain-resisting cord or cords 22. This characteristic is readily achievable by forming the belt according to the flow-through method of Skura, described above and in further detail below.

The fibers 40 in the teeth 16 are also preferably oriented longitudinally, in the run direction of the belt. But the fibers 40 in the teeth 16 are not all parallel to the strain-resisting cords 22; the fibers 40 in the teeth are arranged longitudinally, yet follow the flow direction of the elastomeric material during tooth formation when formed according to the flow-through method. This results in the fibers 40 being oriented in the belt teeth 16 in a longitudinal, generally sinusoidal pattern, which matches the profile of the teeth 16. As furthermore illustrated in FIG. 3, when formed according to the flow-through method of Skura, at least a portion of the fibers in the back surface section 12 of the belt in the area opposite any given tooth 16 may also dip slightly to form a slightly curvilinear configuration. This is a consequence of the fibers following the flow direction of the elastomer during tooth formation, and has not been found to adversely impact the performance of the belt.

When oriented in this preferred configuration, such that the direction of fibers is generally in the run direction of the toothed belt, it has been found that the fibers 40 located in the belt's back surface section 12 inhibit the propagation of cracks in the belt's back surface, particularly those caused by operation at excessively high or low temperature, which otherwise generally propagate in a direction perpendicular to the run direction of the belt. However, it is to be understood that the fibers 40 need not be oriented or may be oriented in a different direction or directions than illustrated.

Figure 3:
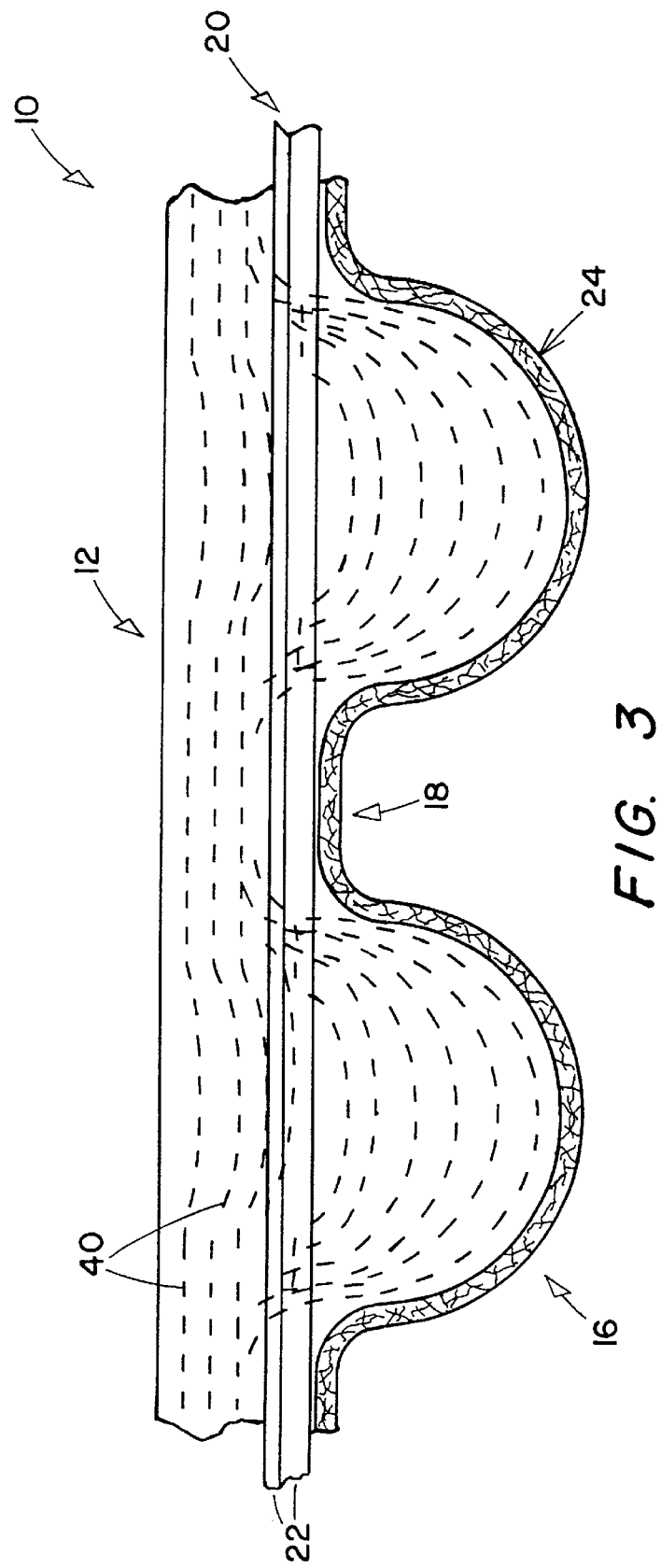
FIG. 3 is a longitudinal cross-sectional view of a synchronous belt made in accordance with an embodiment of the present invention.

While the present invention is illustrated with reference to the embodiments shown in FIGS. 1–3 it should be understood that the present invention is not to be limited to these particular embodiments or forms as illustrated but rather is applicable to any dynamic application construction within the scope of the claims as defined below.

The nitrile group-containing copolymer rubber composition useful in the present invention may be cured with sulfur, organic peroxide, or other free-radical promoting material. The elastomeric material may also be cured in a mixed cure system, utilizing a combination of sulfur, an organic peroxide or other free-radical promoting material. In a preferred embodiment of the present invention, the nitrile group-containing, highly saturated copolymer rubber is sulfur cured. Possible sulfur donors for curing include but are not limited to tetra-methyl-thiuram di-sulfide, tetra-ethyl-thiuram di-sulfide, di-pentamethylene thiuram di-sulfide, di-pentamethylene thiuram tetra-sulfide, di-pentamethylene thiuram hexa-sulfide, di-thio-di-morpholine, di-thio-di-caprolactam and 2-(4-morpholinyl di-thio)-benzothiazole. It is believed that if the nitrile rubber is cured with an organic peroxide and reinforced with fiber in accordance with the present invention, the high temperature resistance of the power transmission belt would be even higher than a similar sulfur-cured rubber, and would potentially reach peak operating temperatures of 160° to 165° C. or higher.

Other conventional elastomeric additives, process and extender oils, antioxidants, waxes, pigments, plasticizers, softeners and the like may be added according to common rubber processing practice without departing from the present invention. For example, in a preferred embodiment of the present invention, the elastomeric material also contains carbon black, a plasticizer preferably in an amount up to about 20 parts per hundred weight of elastomer, antioxidants, cure accelerators and a cure retarder.

COMPARATIVE EXAMPLES

Examples 1–12

Synchronous belts were produced by the flow through method described by Skura in U.S. Pat. No. 3,078,206, and formed substantially in accordance with the illustration shown in FIG. 1. Belts were manufactured from a conventional HNBR copolymer (containing two polymers only), with and without fiber reinforcement, at two different carbon black levels (Comparative Samples 1 and 3 and Samples 2 and 4). Another group of belts was prepared from a nitrile group-containing, highly saturated copolymer rubber containing at least a third monomer possessing the characteristic of lowering the glass transition temperature of the rubber as described above, which was sulfur-cured, with and without fiber reinforcement, at three different carbon black reinforcement levels (Comparative Samples 5, 7 and 9 and Samples 6, 8 and10). Finally, a third group of belts was prepared from the same additional-monomer-containing, nitrile group-containing, highly saturated copolymer rubber described above, which was peroxide-cured, with and without fiber reinforcement, at a single carbon black reinforcement level (Comparative Sample 11 and Sample 12).

The fiber reinforcement used in the even-numbered samples shown to illustrate embodiments of the present invention was 3.0 parts by weight per 100 parts rubber of a para-aramid fibrillated fiber or pulp having the chemical designation, polyparaphenylene terephthalamide, available under the trademark, TWARON, from the company formerly known as Akzo Chemical (now Twaron Products).

Each belt was characterized by a width of approximately 19 mm, 97 teeth, and a tooth pitch of about 9.5 mm (3/8 in.). The tensile layer in each case consisted of a pair of Nippon Glass Fiber cords, with a diameter of about 1.15 mm and 2.0 twists per inch (0.45 to 0.79 twists/cm), spaced at about 18 to 20 strands per inch (7 to 8 strands/cm) belt width.

Table 1 sets out the rubber formulations utilized in the belt Samples and Comparative Samples 1–12. The formulations were mixed in a B Banbury mixer having an inner volume of 1.7 liters. Mixing was carried out at approximately 40 rpm. The batches were processed as three pass mixes. In the first pass all ingredients except the vulcanizing agents, accelerators and retarders were added to the Banbury and mixed for 4 minutes or to a maximum temperature of 140° C. In the second pass the batch was re-mixed for approximately 2 more minutes or until the temperature reached 140° C. In the third pass, the remaining ingredients were added and mixed until the batch temperature reached 100° C. After each pass, the batch was cooled on a two-roll mill. Synchronous belts were then produced by the flow through method.

TABLE 1

| Formulation | 1 COMPARATIVE | 2 | 3 COMPARATIVE | 4 | 5 COMPARATIVE | 6 | 7 COMPARATIVE | 8 | 9 COMPARATIVE | 10 | 11 COMPARATIVE | 12 |
|---|---|---|---|---|---|---|---|---|---|---|---|---|
| THERBAN C3446[1] | 100.0 | 100.0 | 100.0 | 100.0 | — | — | — | — | — | — | — | — |
| THERBAN XN535C[2] | — | — | — | — | 100.0 | 100.0 | 100.0 | 100.0 | 100.0 | 100.0 | 100.0 | 100.0 |
| P-aramid fibrillated fiber[3] | — | 3.0 | — | 3.0 | — | 3.0 | — | 3.0 | — | 3.0 | — | 3.0 |
| N550 Carbon Black[4] | — | — | — | — | 70.0 | 70.0 | 55.0 | 55.0 | 30.0 | 30.0 | — | — |
| N772 Carbon Black[5] | 60.0 | 60.0 | 55.0 | 55.0 | — | — | — | — | — | — | 50.0 | 50.0 |
| T810T[6] | 10.0 | 10.0 | 10.0 | 10.0 | — | — | — | — | — | — | — | — |
| RS-735[7] | — | — | — | — | 15.0 | 15.0 | 15.0 | 15.0 | 15.0 | 15.0 | 10.0 | 10.0 |
| ZnO[8] | 5.0 | 5.0 | 5.0 | 5.0 | 5.0 | 5.0 | 5.0 | 5.0 | 5.0 | 5.0 | 5.0 | 5.0 |
| IPPD[9] | 1.0 | 1.0 | 1.0 | 1.0 | 1.0 | 1.0 | 1.0 | 1.0 | 1.0 | 1.0 | — | — |
| DTPD[10] | — | — | — | — | 1.0 | 1.0 | 1.0 | 1.0 | 1.0 | 1.0 | — | — |
| Stearic acid[11] | 1.0 | 1.0 | 1.0 | 1.0 | 1.0 | 1.0 | 1.0 | 1.0 | 1.0 | 1.0 | — | — |
| Sulfur[12] | 0.8 | 0.8 | 0.8 | 0.8 | 0.5 | 0.5 | 0.5 | 0.5 | 0.5 | 0.5 | — | — |
| TMTD[13] | 1.5 | 1.5 | 1.5 | 1.5 | — | — | — | — | — | — | — | — |
| TETD[14] | — | — | — | — | 2.0 | 2.0 | 2.0 | 2.0 | 2.0 | 2.0 | — | — |
| CBS[15] | 0.5 | 0.5 | 0.5 | 0.5 | 0.5 | 0.5 | 0.5 | 0.5 | 0.5 | 0.5 | — | — |
| TDEC[16] | 0.5 | 0.5 | 0.5 | 0.5 | 0.5 | 0.5 | 0.5 | 0.5 | 0.5 | 0.5 | — | — |
| DPTT[17] | 0.7 | 0.7 | 0.7 | 0.7 | 0.7 | 0.7 | 0.7 | 0.7 | 0.7 | 0.7 | — | — |
| VULKALENT E/C[18] | 0.5 | 0.5 | 0.5 | 0.5 | 0.5 | 0.5 | 0.5 | 0.5 | 0.5 | 0.5 | — | — |
| NAUGARD Q[19] | — | — | — | — | — | — | — | — | — | — | 1.0 | 1.0 |

TABLE 1-continued

| Formulation | 1 COM PARA TIVE | 2 | 3 COM PARA TIVE | 4 | 5 COM PAR ATIV E | 6 | 7 COM PAR ATIV E | 8 | 9 COM PAR ATIV E | 10 | 11 COM PAR ATIV E | 12 |
|---|---|---|---|---|---|---|---|---|---|---|---|---|
| VULKANOX ZMB2[20] | — | — | — | — | — | — | — | — | — | — | 0.5 | 0.5 |
| LUPEROX F40[21] | — | — | — | — | — | — | — | — | — | — | 8.0 | 8.0 |

[1]THERBAN C3446 by Bayer (hydrogenated nitrile-butadiene rubber (HNBR) copolymer)
[2]THERBAN XN535C by Bayer (Nitrile group-containing highly saturated copolymer rubber)
[3]Added via RHENOGRAN P91/50 50% p-aramid fiber (fibrillated) in EPDM masterbatch by Bayer (RheinChemie)
[4]STERLING SO N550 carbon black by Cabot
[5]REGAL SRF N772 carbon black by Cabot
[6]BISOFLEX T810T tri-(8-10 alkyl) tri-mellitate plasticizer by Inspec
[7]ADKCIZER RS-735 ether-ester plasticizer from Asahi Denka Kogyo
[8]EXTROX 100 Zinc Oxide by Elementis Specialities
[9]PERMANAX IPPD Iso-propyl phenyl p-phenylene diamine anti-degradent, by Flexsys
[10]VULKANOX 3100 Di-aryl-p-phenylene diamine anti degradent, by Bayer
[11]Stearic acid by H. Foster & Co.
[12]Sulfur by Hays Chemical Distribution.
[13]PERKACIT TMTD tetra-methyl thiuram di-sulfide cure accelerator, by Flexsys
[14]PERKACIT TETD tetra-ethyl thiuram di-sulfide cure accelerator, by Flexsys
[15]VULKACIT CZ N-cyclohexyl-2-benzothiazole sulfonamide cure accelerator, by Bayer
[16]PERKACIT TDEC tellurium di-ethyl di-thiocarbamate cure accelerator, by Flexsys
[17]PERKACIT DPTT di-pentamethylene thiuram tetra-sulfide cure accelerator, by Flexsys
[18]VULKALENT ETC N-phenyl-N-(trichloromethylsulphenyl)-benzenesulphonamide cure retarder, by Bayer
[19]NAUGARD Q-polymerized 1,2-dihydro-2,2,4-trimethylquinoline by Uniroyal Chemical
[20]VULKANOX ZMB2-zinc 4- and 5-methyl-2-mercaptobenzimidazole antioxidant, by Bayer
[21]LUPEROX F40 - 40% Di(2-tert-butyl-peroxy-iso-propyl)-benzene on calcium carbonate, by Atochem Various tests were run on the synchronous belts listed in Table 1. These tests included a cold crack test, and a heat resistance test. The results of these tests can be found in Table 2.

Figure 4:
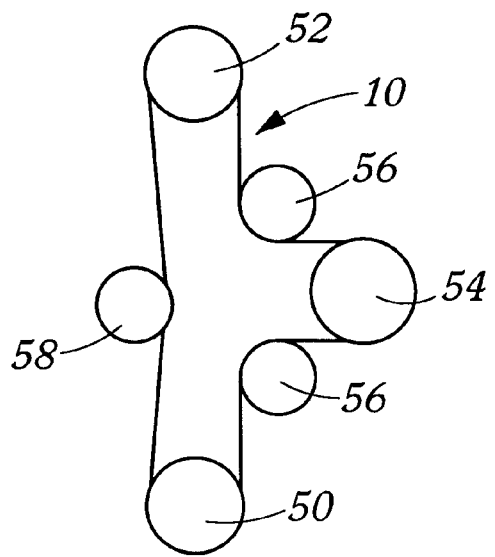
FIG. 4 is a schematic diagram showing a pulley arrangement for a synchronous belt cold crack test.

The cold crack test is illustrated in FIG. 4. In the cold crack test, a synchronous belt was run on a driving pulley 50 with 19 grooves, two driven pulleys 52 and 54, with 19 grooves and 20 grooves respectively, two backside idlers 56 (50 mm diameter) and a tensioner 58. A tension of 200 N was applied with the tensioner 58 by a hanging weight. The driving pulley 50 was rotated at 720 rpm for 1 minute and then left stationary for 59 minutes. This was repeated for either 10 or 50 hours (depending upon the particular test) and the synchronous belt was then inspected for cracks in the back surface section. If no cracks were visible in the back surface section of the synchronous belt, the temperature of the test was reduced by 5° C. in the 10-hour test or 2° C. in the 50-hour test and the test was repeated on a new belt specimen. If cracks were visible in the back surface section of the synchronous belt, the temperature of the test was increased by 5° C. in the 10-hour test or 2° C. in the 50-hour test and the test was repeated on a new belt specimen. The lowest temperature that yielded one or more cracks in the back surface section of the synchronous belt was recorded, as was a qualitative description of the type and/or number of cracks formed at that temperature. The low temperature tests were performed on two pieces of test equipment, designated in the table below as "L" and "R". For the low temperature tests, at the first sign of cracking of a particular belt at a particular temperature, the test was terminated on both pieces of equipment, and the temperature noted. While the 10-hour low temperature test is believed to roughly approximate the conditions at which one could expect an automotive synchronous belt to operate in very cold climates, and is therefore believed to reflect values within the operational range of the belts tested, the 50-hour low temperature test is believed to be an intensely rigorous, accelerated test.

Figure 5:
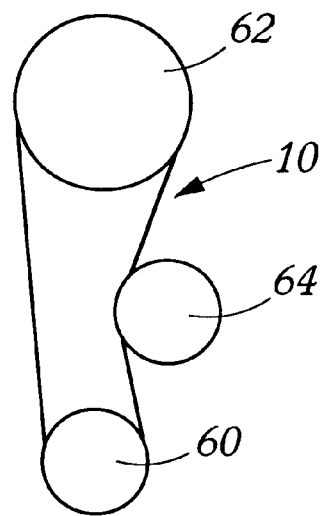
FIG. 5 is a schematic diagram showing a pulley arrangement for a synchronous belt heat resistance test.

The heat resistance (i.e., high temperature aging) test is illustrated in FIG. 5. In the heat resistance test arrangement, a driving pulley 60 with 19 grooves was rotated at approximately 8000 rpm. The arrangement also included a driven pulley 62, with 38 grooves and a tensioner 64. The tensioner 64 had a diameter of 50 mm; a tension of 220 N was applied by a hanging weight. The test arrangement in FIG. 5 run with a synchronous belt was run in a hot box with the air temperature controlled at 140° C. The time to failure in hours was recorded upon tooth shear or visible cracks in the back surface section of the synchronous belt.

TABLE 2

| Formulation | 1 COM PAR ATIV E | 2 | 3 COM PAR ATIV E | 4 | 5 COM PAR ATIV E | 6 | 7 COM PAR ATIV E | 8 | 9 COM PAR ATIV E | 10 | 11 COM PAR ATIV E | 12 |
|---|---|---|---|---|---|---|---|---|---|---|---|---|
| 100% Compound Modulus (kg/cm$^2$)[22] | 4.3 | 10.8 | 3.8 | 9.5 | 5.8 | 8.4 | 4.2 | 8.5 | 1.7 | 4.8 | 2.3 | 5.7 |
| 10 hour Cold Crack Test (° C. at Failure) | | ≧−35 | | | ≧−40 | <−40 | | | <−40 | | | |
| 50 hr Cold Crack | | | | | | | | | | | | |

TABLE 2-continued

| Formulation | 1 COMPARATIVE | 2 | 3 COMPARATIVE | 4 | 5 COMPARATIVE | 6 | 7 COMPARATIVE | 8 | 9 COMPARATIVE | 10 | 11 COMPARATIVE | 12 |
|---|---|---|---|---|---|---|---|---|---|---|---|---|
| (° C. at Failure, (L)) | −26 | −26 | −26 | −26 | −34 | ≦−34 | >−36 | >−36 | −36 | −36 | −34 | — |
| (° C. at Failure, (R)) | −26 | <−26 | −26 | ≦−26 | <−34 | <−34 | >−36 | −36 | ≦−36 | <−36 | — | ≧−38 |
| Heat Resistance Test Life at 140° C. (hours) | 479 | 597 | 558 | 813 | 208 | 254 | 303 | 595 | 402 | 792 | 399 | 446 |

[22]Compound modulus measured in tension
[23](L) represents results on first equipment piece and (R) represents results on second equipment piece.
For Cold Tests: < signifies no cracks; ≦ signifies one or two cracks; ≧ signifies many cracks; > signifies many large cracks; otherwise only a few small cracks were observed.

Table 2 shows that the modulus, or stiffness, as well as the heat resistance at 140° C. of each sample improves considerably with the addition of the p-aramid fiber reinforcement for a given elastomer composition, as expected. This trend is seen in both the hydrogenated nitrile-butadiene rubber (HNBR) copolymer (incorporating two monomers only) samples 2 and 4 and comparative samples 1 and 3 and the nitrile group-containing, highly saturated copolymer rubber samples 6, 8, 10 and 12 and comparative samples 5, 7, 9, and 11 in Table 2. In each of pairs 1 and 2, 3 and 4, 5 and 6, 7 and 8, 9 and 10, and 11 and 12, a higher modulus and high temperature resistance is seen in the fiber containing, even numbered Sample belt.

Table 2 also shows the unexpected result of increased low temperature resistance with the addition of fiber. This trend is seen in both the HNBR copolymer-based belts wherein the copolymer contains two monomers only and the nitrile group-containing, highly saturated copolymer rubber-based belts wherein the copolymer includes an additional monomer possessing the characteristic of lowering the glass transition temperature of the rubber. Belts produced from the HNBR copolymer without fiber reinforcement, Comparative samples 1 and 3, cracked at −26° C. in the 50 hour cold crack test, (second equipment piece) whereas the belt samples produced from the HNBR copolymer with 3 parts by weight p-aramid fiber reinforcement per hundred of polymer, Samples 2 and 4, showed no cracks and one or two cracks respectively at −26° C. in the 50 hour cold crack test (second equipment piece). Thus the addition of the fiber reinforcement in the HNBR copolymer allowed the belt samples to perform better at the low temperature of −26° C.

The nitrile group-containing, highly saturated copolymer rubber samples containing at least one monomer which possesses the characteristic of lowering the glass transition temperature of the rubber also showed this unexpected trend of low temperature improvement with the addition of fiber reinforcement. In the results of the 10 hour cold crack test shown in Table 2, one can see that the belt produced from the nitrile group-containing, highly saturated copolymer rubber without fiber, Comparative Sample 5, exhibited many cracks at −40° C. in the 10 hour cold crack test, whereas the belt produced from the nitrile group-containing, highly saturated copolymer rubber with fiber reinforcement did not crack at −40° C. Similar results were seen at the 50-hour cold crack test for Comparative Sample 5 and Sample 6. For those belts tested on the first equipment piece, just one or two small cracks were seen with the fiber-containing sample, whereas more cracks were seen with the sample not containing fiber.

Similar results were seen at a lower carbon black loading, e.g., in Comparative Sample 9 and Sample 10, in the 50-hour cold crack test (second equipment piece). Comparative Sample 9, a belt produced from the nitrile group-containing, highly saturated copolymer rubber (containing the glass-transition-temperature-lowering monomer(s)) without fiber, showed one or two cracks at −36° C. in the 50 hour cold crack test; Sample 10, a belt identical to the Comparative Sample 9 formulation except for the addition of 3 parts by weight fibrillated p-aramid fiber reinforcement per hundred of polymer did not show any cracks at −36° C.

By comparing cold crack test data points for a given type of elastomer, at a given carbon black level, on a single piece of equipment, both with and without fiber loading, one finds that in each case, the addition of fiber loading either improved or maintained the low temperature crack resistance of the belt elastomer compared to the non-fiber loaded examples. Thus for example, for Comparative Sample 5 and Sample 6 under the 50-hour cold crack test, first equipment piece ("L"), Sample 5 showed an improvement in low temperature crack resistance. An improvement or maintenance of low temperature capability is illustrated in each so-defined pair of samples and comparative samples.

It should be noted that upon review of data, it was found that the data collected on the second equipment piece (designated, "R") showed a higher degree of difference between the fiber loaded and the non-fiber loaded examples. While the reason for this difference is not presently known, it is believed that the present invention nevertheless provides significant improvement in low temperature performance compared to configurations of the prior art.

Moreover, an additional beneficial feature of the present invention pertaining to a preferred nitrile-group containing copolymer is illustrated in a comparison of the high temperature test results of Comparative Sample 3, Comparative Sample 7 and Sample 8. Each said sample contains the same amount of carbon black filler (i.e., 55 phr). Comparative Sample 7 and Sample 8 however include elastomer portions comprising a nitrile group-containing, highly saturated copolymer rubber preferred in the practice of the present invention, and which includes a monomer possessing the characteristic of lowering the glass transition temperature of the rubber, while Comparative Sample 3 is formed of a more conventional hydrogenated nitrile-butadiene rubber having low temperature properties inferior to that of the preferred rubber. (See, e.g., 50-hour cold crack test results, Table 2.) Notably, for the non-fiber loaded examples, the heat resistance properties of that sample formed of the hydrogenated nitrile-butadiene rubber (Comparative Sample 3) exceeded that of the sample formed of that nitrile rubber exhibiting improved low temperature capability (Comparative Sample 7). The respective low- and high temperature test results for Sample 8 however reflect an optimum balance of low and high temperature capability. It has been found that by incorporating fiber into the nitrile-group-containing, highly saturated copolymer elastomeric portions of a belt in accordance with the present invention, and particularly into the back surface region thereof, one may obtain a belt having a good balance of durability and high and low temperature resistance, having an operating range of from about −40° C. to at least about 140° C.

The improvement in both high and low temperature properties of the power transmission belt of the present invention is attributable to the incorporation as its main belt body portion, of an elastomeric material comprising 100 parts by weight of an at least partially hydrogenated nitrile rubber and from about 0.5 to about 50 parts per hundred weight of said nitrile copolymer rubber of a fiber reinforcement. The nitrile rubber is preferably highly saturated and comprises (1) from about 5 to about 40 percent of unsaturated nitrile monomer units, (2) from about 1 to about 80 percent of units of at least one second monomer which possesses the characteristic of lowering the glass transition temperature of the rubber, and which is preferably selected from the group consisting of fluorine-free unsaturated carboxylic acid ester monomer units and fluorine-containing vinyl monomer units, (3) up to about 20 percent of conjugated diene monomer units and (4) the balance being hydrogenated conjugated diene monomer units, wherein the sum of the contents of the monomer units (1) and (2) is from about 30 to 90 percent by weight and the sum of the contents of the monomer units (3) and (4) is from about 10 to about 70 percent by weight. The use of the fiber reinforcement in the nitrile group-containing, highly saturated copolymer rubber has unexpectedly been found to provide substantially improved low temperature crack resistance while improving the high temperature resistance of the belt.

In a preferred embodiment of the present invention, the fiber reinforcement is selected such that the belt has an operational temperature range of from about −40° C. to at least about 140° C. That is to say, the belt preferably has a failure temperature in the cold crack test at 10 hours as hereinbefore defined of less than −30° C., more preferably less than −35° C., and most preferably less than −40° C. Preferably, the belt has a failure temperature in the cold crack test at 50 hours as hereinbefore defined of less than −25° C., more preferably less than −30° C. and most preferably less than −35° C. The belt preferably has a time to failure in the heat resistance test at 140° C. as hereinbefore defined of at least 250 hours, more preferably at least 400 hours, and most preferably at least 500 hours.

Although the present invention has been described in detail for the purpose of illustration, it is to be understood that such detail is solely for that purpose and that variations can be made therein by one skilled in the art without departing from the spirit or scope of the present invention except as it may be limited by the claims. The invention disclosed herein may suitably be practiced in the absence of any element not specifically disclosed herein.

What is claimed is:

1. A toothed power transmission belt adapted to engage a pulley, comprising a main belt body portion, a pulley contact portion integral with said body portion, tensile means disposed in said body portion, wherein at least one of said body portion and said pulley contact portion comprises an elastomeric composition comprising: 100 parts by weight of an at least partially hydrogenated nitrile group containing copolymer rubber; and from about 0.5 to about 50 parts per hundred weight of said copolymer of a fiber reinforcement; and characterized in that:

i) said copolymer rubber comprises:
 a) from about 5 to about 40 percent of unsaturated nitrile monomer units;
 b) from about 1 to about 80 percent units of at least one monomer possessing the characteristic of lowering the glass transition temperature of said rubber;
 c) up to about 20 percent of conjugated diene monomer units; and
 d) the balance being hydrogenated conjugated diene monomer units; and
ii) said belt possesses low temperature crack resistance to at least about −35° C.

2. The belt of claim 1 wherein the sum of the contents of the monomer units (a) and (b) is from about 30 to 90 percent by weight and the sum of the contents of the monomer units (c) and (d) is from about 10 to about 70 percent by weight.

3. The belt of claim 1 wherein said fiber is one selected from the group consisting of chopped fibers and pulped fibers.

4. The belt of claim 1 wherein said fibers are formed of a material selected from the group consisting of para-aramids; meta-aramids; polyester; polyamide; cotton; rayon; glass and combinations of two or more of the foregoing.

5. The belt of claim 1 wherein the rubber is one selected from the group consisting of THERBAN XN535C; ZETPOL 4110, ZETPOL 4120; ZETPOL 3110 and ZETPOL 3120.

6. The belt of claim 1 wherein the rubber is cured using an agent selected from the group consisting of: sulfur, organic peroxide, other free-radical producing curatives, and combinations of two or more of the foregoing.

7. The belt of claim 1 wherein at least a portion of said fibers are located in said main belt body portion and are oriented in the run direction of the belt.

8. The belt of claim 1 further comprising a plasticizer in an amount of from about 2 to about 20 parts per hundred weight of rubber.

9. A belt drive system comprising the belt of claim 1 trained about at least one driver pulley and at least one driven pulley.

10. The belt of claim 1 wherein said copolymer comprises from about 0.5 to 20 parts per hundred weight of said copolymer of said fiber reinforcement.

11. The belt of claim 2 wherein said at least one monomer possessing the characteristic of lowering the glass transition temperature of said rubber is one selected from the group consisting of fluorine-free unsaturated carboxylic acid ester monomer units and fluorine-containing vinyl monomer units.

12. The belt of claim 3 wherein said fibers are chopped and possess an aspect ratio of at least 10 and a length of from about 0.1 to about 5 mm.

13. The belt of claim 3 wherein said fiber is fibrillated and has an average surface area of from about 3 $m^2/g$ to about 12 $m^2/g$.

14. The belt of claim 3 wherein said fiber is fibrillated and has an average fiber length of from about 0.3 mm to about 3.5 mm.

15. The belt of claim 3 wherein at least a portion of said fibers are located in said main belt body portion.

16. A toothed power transmission belt adapted to engage a pulley, comprising a main belt body portion, a toothed pulley contact portion integral with said body portion, a tensile member disposed in said body portion, wherein at least one of said body portion and said pulley contact portion comprises an elastomeric composition, and characterized in that said elastomeric composition comprises:
 (a) 100 parts by weight of an elastomer selected from the group consisting of THERBAN XN535C; ZETPOL 4110, ZETPOL 4120; ZETPOL 3110 and ZETPOL 3120; and (b) from about 2 to about 4 parts per hundred weight of said elastomer of pulped fiber having an average surface area of from about 3 $m^2/g$ to about 12 $m^2/g$ and an average fiber length of from about 0.5 mm to about 2.0 mm.

17. A belt drive system comprising the belt of claim 16 trained about at least one driver pulley and at least one driven pulley.

* * * * *